No. 663,093. Patented Dec. 4, 1900.
R. C. HILTON.
VALVE FOR INFLATION.
(Application filed July 10, 1900.)
(No Model.)

Witnesses
R. F. Storm
I. J. Masson

Inventor
Roland C. Hilton
By E. E. Masson, his Attorney

UNITED STATES PATENT OFFICE.

ROLAND C. HILTON, OF NEW BEDFORD, MASSACHUSETTS, ASSIGNOR OF ONE-FOURTH TO JAMES M. WILLIS, JR., OF SAME PLACE.

VALVE FOR INFLATION.

SPECIFICATION forming part of Letters Patent No. 663,093, dated December 4, 1900.

Application filed July 10, 1900. Serial No. 23,117. (No model.)

*To all whom it may concern:*

Be it known that I, ROLAND C. HILTON, a citizen of the United States, residing at New Bedford, in the county of Bristol and State of Massachusetts, have invented certain new and useful Improvements in Valves for Inflation, of which the following is a specification, reference being had therein to the accompanying drawings.

This invention has for its object the production of simple, reliable, and inexpensive devices to facilitate the inflation of articles, particularly pneumatic tires, the devices consisting principally of two parts, one being secured to the object to be inflated and the other a controller adapted to be secured either to the first part or to the inflator.

The invention consists partly in the peculiar means employed to adapt the second or outer part to open and close the valve at the lower end of the first or inner part of the device when desired and to the valve on the inner end of a peculiar valve-stem, having its lower portions made quadrangular and its upper end provided with a broad head abutting upon a hollow screw-plug having a hexagonal body, as shown in the accompanying drawings, in which—

Figure 1:
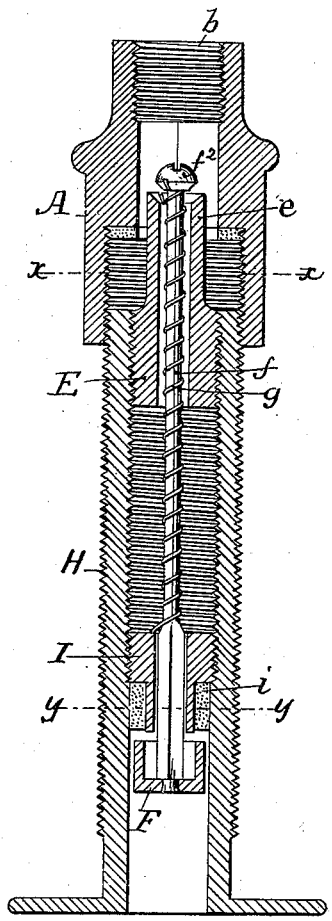
Figure 2:
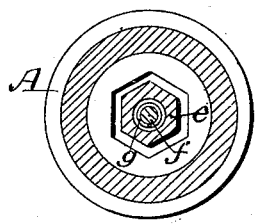
Figure 3:
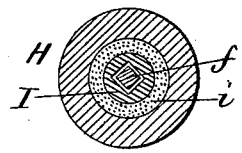

Figure 1 represents, on an enlarged scale, a longitudinal central section of the outer and inner parts of the device coupled together as during the process of inflation. Fig. 2 is a transverse section on line $x\,x$ of Fig. 1 looking upward, showing the hexagonal body of the hollow screw-plug and the corresponding hexagonal socket therefor in the outer part of the device. Fig. 3 is a transverse section on line $y\,y$ of Fig. 1, showing the square valve-stem and the correspondingly-bored valve-seat carrier for the closing-valve.

In said drawings, A represents the tubular casing of the outer part of the device having the interior of its upper end screw-tapped at $b$ to receive the screw-threaded tip generally carried by a rubber hose leading to an air-pump. The interior portion below the screw $b$ has a central perforation of polygonal form, preferably hexagonal, to receive, guide, and control, as a watch-key, the corresponding hexagonal head $e$ of a hollow plug E, located within the inner part of the device. Said plug E is centrally perforated for the free passage of air and of the valve-stem $f$ of the valve F and has a right-hand screw-thread around its periphery. The valve F is cup-shaped and is either riveted to or made integral with its stem $f$.

The inner part of the device consists of the tube H, which is screw-threaded externally with a right-hand thread for engagement with the casing A of the outer part of the device, and said screw-thread can be used to retain the tire-retaining clamping-ring commonly used with this class of devices. The tube H is also screw-tapped internally with a right-hand thread for engagement at its upper end with the hollow plug E and lower down with the valve-seat carrier I. Said carrier is centrally provided with a square perforation to receive loosely therein the square lower portion of the valve-stem $f$, these square interlocked parts permitting the location of the valve-seat carrier I to be adjusted within the tube H by rotating the valve-stem $f$ by means of the end of a screw-driver inserted in the slot formed in its head $f^2$. The under side of the head $f^2$ or the upper end of the hexagonal head $e$ of the hollow plug E has radial serrations to permit the passage of air between them at any time.

The lower half of the valve-seat carrier I is of reduced diameter and has either yielding packing-rings or packing $i$ around said reduced portion to constitute a yielding valve-seat for the edge of the valve F. Coiled around the valve-stem $f$ and fitting loosely in the central passage of the plug E there is a spring $g$, of fine wire, having its lower end bearing upon the top of the seat-carrier I and its upper end against the under side of the head $f^2$ of the valve-stem. The resilience of the spring is only slightly stronger than necessary to carry the weight of the valve-stem and valve, so that the latter is normally bearing against its seat or the packing $i$, but not strong enough to prevent it from being pressed down by the jet of air sent down by the air-pump while its piston is forced downward; but the spring $g$ causes the valve F to act as a check-valve while the pump's piston is ascending for a new stroke. After the tire has been filled sufficiently with air the act of disconnecting the outer part A of the device by unscrewing it from the tube H rotates the plug E and elevates it, so that its upper end bears firmly against the under side of the head $f^2$ of the valve-stem and brings the edge of the valve F firmly against its seat-packing $i$ in conjunction with the spring on its stem.

Although the valve-seat carrier I is shown adjustable within the tube H, it may also be permanently attached to the latter and the valve-stem $f$ be made cylindrical the whole length thereof. The screw-thread on the plug E may be so inclined as to travel rapidly up and down within the tube.

Having now fully described my invention, I claim—

1. In a valve for inflation, the combination of a tube screw-threaded both internally and externally with right-hand screw-threads, a valve-seat carrier secured within said tube, a hollow screw-plug adjustably retained within said tube and having a polygonal head, with a valve having its stem passing through the valve-seat carrier and through the screw-plug, its head normally resting upon said plug, and a casing adapted to engage the screw-threaded tube and the polygonal head of the screw-plug, substantially as described.

2. The combination of a casing having internally a polygonal socket, with the tube H having right-hand screw-threads both externally and internally, a valve-seat carrier secured within said tube, a hollow screw-plug adjustably retained within said tube and having a polygonal head, with a valve having its stem passing through the valve-seat carrier and through the screw-plug, its head normally resting upon said plug, and a spring coiled around the valve-stem and sustaining its weight, substantially as described.

In testimony whereof I affix my signature in presence of two witnesses.

ROLAND C. HILTON.

Witnesses:
CLIFFORD P. SHERMAN,
JAMES P. DORAN.